US012730366B2

(12) United States Patent
Wu

(10) Patent No.: US 12,730,366 B2
(45) Date of Patent: Sep. 8, 2026

(54) PROJECTION DEVICE

(71) Applicant: Coretronic Corporation, Hsin-Chu (TW)

(72) Inventor: Chia-Cheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 424 days.

(21) Appl. No.: 18/401,743

(22) Filed: Jan. 2, 2024

(65) Prior Publication Data

US 2024/0231204 A1 Jul. 11, 2024

(30) Foreign Application Priority Data

Jan. 5, 2023 (CN) ......................... 202310013194.8

(51) Int. Cl.
*G03B 21/16* (2006.01)
*G03B 21/20* (2006.01)

(52) U.S. Cl.
CPC ......... *G03B 21/16* (2013.01); *G03B 21/2033* (2013.01)

(58) Field of Classification Search
CPC ... G03B 21/16; G03B 21/2033; H04N 9/3144
USPC ........................................................... 353/61
See application file for complete search history.

(56) References Cited

U.S. PATENT DOCUMENTS 5,884,691 A 3/1999 Batchelder
6,109,767 A * 8/2000 Rodriguez ............. G03B 21/16 362/373
6,986,582 B2 1/2006 Kobayashi
10,969,667 B2 4/2021 Liu
11,029,588 B2 6/2021 Sugiyama
2008/0117637 A1 5/2008 Chang et al.
2010/0045940 A1 2/2010 Takagi
2016/0330419 A1* 11/2016 Lin ..................... H04N 9/3144
2019/0242569 A1 8/2019 Jiang et al.
2020/0073217 A1 3/2020 Shimizu et al.
2020/0133107 A1 4/2020 Takagi
(Continued)

FOREIGN PATENT DOCUMENTS

CN 101655656 B 5/2011
CN 207354792 U 5/2018
CN 104949080 B 10/2018
(Continued)

OTHER PUBLICATIONS

The first Office Action, dated May 21, 2024, in counterpart Taiwan Application No. 112100390.
(Continued)

*Primary Examiner* — Magda Cruz

(57) ABSTRACT

A disclosure includes a shell, a first heat source, a second heat source, a first porous heat dissipation element, a second porous heat dissipation element and a guide pipe. The shell has a first ventilation opening and a second ventilation opening. The first porous heat dissipation element is connected to the first heat source and opposite to the first ventilation opening. The second porous heat dissipation element is connected to the second heat source and opposite to the second ventilation opening. The guide pipe is connected between the second ventilation side and the third ventilation side and communicated with the first flow channels and the second flow channels.

11 Claims, 13 Drawing Sheets

(56) References Cited

U.S. PATENT DOCUMENTS

2020/0272038 A1 8/2020 Sugiyama

FOREIGN PATENT DOCUMENTS

| | | | |
|---|---|---|---|
| CN | 209763829 | U | 12/2019 |
| CN | 110703556 | A | 1/2020 |
| CN | 111752078 | A | 10/2020 |
| CN | 212463902 | U | 2/2021 |
| CN | 113156748 | A | 7/2021 |
| CN | 114779562 | A | 7/2022 |
| TW | 444877 | U | 7/2001 |
| TW | I591419 | B | 7/2017 |
| TW | 1778817 | B | 9/2022 |
| WO | 2021179768 | A1 | 9/2021 |

OTHER PUBLICATIONS

Lee, Wei-Yi et al., "Projection Device", U.S. Appl. No. 18/495,765, filed Oct. 27, 2023.

The Notice of Allowance and Notice of References Cited, dated Aug. 7, 2024, in U.S. Appl. No. 18/402,759.

* cited by examiner

PROJECTION DEVICE

CROSS-REFERENCE TO RELATED APPLICATION

This application claims the priority benefit of China application (No. 202310013194.8), filed on Jan. 5, 2023. The entirety of the above-mentioned patent application is hereby incorporated by reference herein and made a part of this specification.

TECHNICAL FIELD

The disclosure relates to an imaging device, and more particularly to a projection device.

BACKGROUND

The light source used in a projection device has evolved from UHP lamp, light emitting diode (LED) to laser diode (LD) with the requirements of the market for the brightness, color saturation, service life, non-toxic and environmental protection of the projection device. In addition, the projection device is also equipped with a light valve to generate a beam that forms an image.

In general, the various light sources and light valves mentioned above generate a large amount of thermal energy during the operation of the projection device, so most conventional projection devices are equipped with heat dissipation elements to dissipate heat from the light source and light valve. However, because most of the conventional heat dissipation elements use fins as the heat dissipation medium and the heat dissipation area of fins is limited, the conventional heat dissipation elements must have a large volume to provide sufficient heat dissipation efficiency. Therefore, the conventional heat dissipation components often occupy too much space within the projection device. In addition, because the light source and the light valve may have differences in heat dissipation requirements, it is difficult for the conventional heat dissipation components to be flexibly arranged according to different heat dissipation requirements when the volume of the heat dissipation components cannot be reduced.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

The disclosure provides a projection device to improve the heat dissipation efficiency for different heat sources in a limited space.

Other advantages and objectives of the disclosure may be further illustrated by the technical features broadly embodied and described as follows.

In order to achieve one or a portion of or all of the objectives or other objectives, the projection device provided by the disclosure includes a shell, a first heat source, a second heat source, a first porous heat dissipation element, a second porous heat dissipation element and a guide pipe. The shell has a first ventilation opening and a second ventilation opening. The first porous heat dissipation element is connected to the first heat source. The first porous heat dissipation element has a first ventilation side, a second ventilation side and a plurality of first flow channels. The first ventilation side is opposite to the second ventilation side. The first flow channels extend from the first ventilation side to the second ventilation side, and the first ventilation side is located between the first ventilation opening and the second ventilation side. The second porous heat dissipation element is connected to the second heat source. The second porous heat dissipation element has a third ventilation side, a fourth ventilation side and a plurality of second flow channels. The third ventilation side is opposite to the fourth ventilation side. The second flow channels extend from the third ventilation side to the fourth ventilation side, and the fourth ventilation side is located between the third ventilation side and the second ventilation opening. The guide pipe is connected between the second ventilation side and the third ventilation side and communicated with the first flow channels and the second flow channels.

In an embodiment of the disclosure, the aforementioned projection device further includes a fan. The fan is located between the first ventilation opening and the first ventilation side and/or the fan is located between the fourth ventilation side and the second ventilation opening. The fan is configured to guide an airflow to flow through the first porous heat dissipation element, the guide pipe and the second porous heat dissipation element in sequence, and the airflow flows out of the shell from the second ventilation opening.

In an embodiment of the disclosure, the first porous heat dissipation element further has a plurality of first sidewalls. The first sidewalls are connected between the first ventilation side and the second ventilation side. The second porous heat dissipation element further has a plurality of second sidewalls, and the second sidewalls are connected between the third ventilation side and the fourth ventilation side.

In an embodiment of the disclosure, shapes of the first flow channels and the second flow channels include cylindrical or hexagonal columns.

In an embodiment of the disclosure, the first flow channels are distributed in all the first porous heat dissipation element. The second flow channels are distributed in all the second porous heat dissipation element.

In an embodiment of the disclosure, the first porous heat dissipation element further has a first sidewall. The first sidewall has a first surface and a second surface opposite to each other. The first heat source is arranged on the first surface, and the first ventilation side, the second ventilation side and the first flow channels are located on a part or all the second surface. The second porous heat dissipation element further has a second sidewall. The second sidewall has a third surface and a fourth surface opposite to each other. The second heat source is arranged on the third surface, and the third ventilation side, the fourth ventilation side and the second flow channels are located on a part or all the fourth surface.

In an embodiment of the disclosure, the aforementioned projection device further includes a heat dissipation layer. The heat dissipation layer is arranged in all the first flow channels and all the second flow channels, or in part of the first flow channels and part of the second flow channels.

In an embodiment of the disclosure, a material of the guide pipe includes metal or plastic.

In an embodiment of the disclosure, the aforementioned projection device further includes a heat conductive element and a heat conductive layer. The heat conductive element is fixed to the first porous heat dissipation element and the second porous heat dissipation element. The heat conductive layer is arranged between the heat conductive element and the first porous heat dissipation element, and the heat conductive layer is arranged between the heat conductive element and the second porous heat dissipation element.

In an embodiment of the disclosure, the first heat source includes a light valve, and the second heat source includes a light source.

In an embodiment of the disclosure, volumes of the first flow channels are different from each other, and volumes of the second flow channels are different from each other.

The projection device of the disclosure adopts a first porous heat dissipation element and a second porous heat dissipation element to dissipate heat from the first heat source and the second heat source. Specifically, because the first porous heat dissipation element and the second porous heat dissipation element can provide sufficient heat dissipation area within a limited space, the first porous heat dissipation element and the second porous heat dissipation element can be more flexibly arranged according to the heat dissipation needs of different heat sources. In addition, the first porous heat dissipation element and the second porous heat dissipation element are connected by a guide pipe to avoid significant air loss between the first porous heat dissipation element and the second porous heat dissipation element, thereby increasing the amount of the airflow flowing through the first porous heat dissipation element and the second porous heat dissipation element. Therefore, the projection device of the disclosure can improve the heat dissipation efficiency of different heat sources in a limited space.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
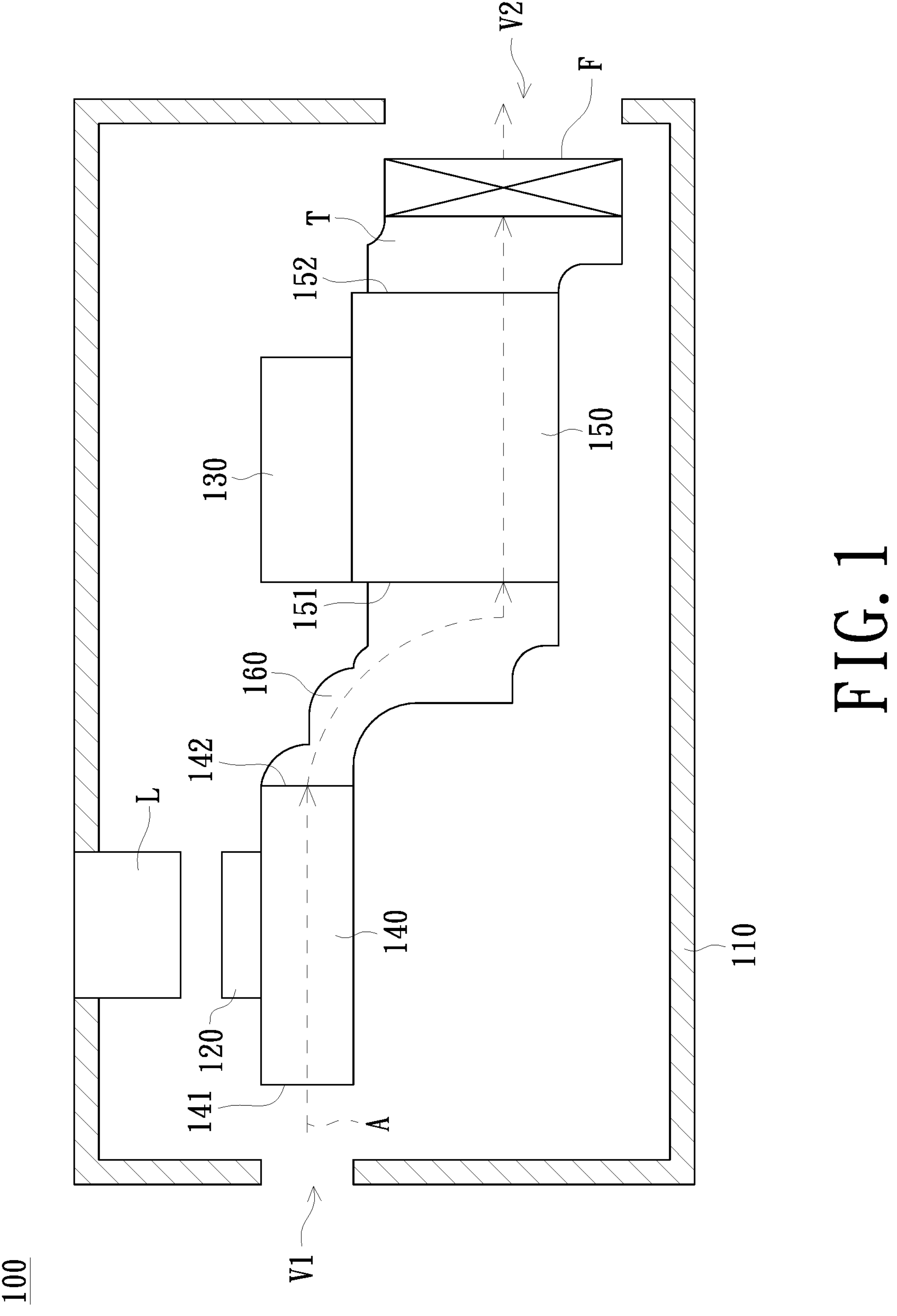
FIG. 1 is a schematic diagram of a projection device according to an embodiment of the disclosure.
Figure 2:
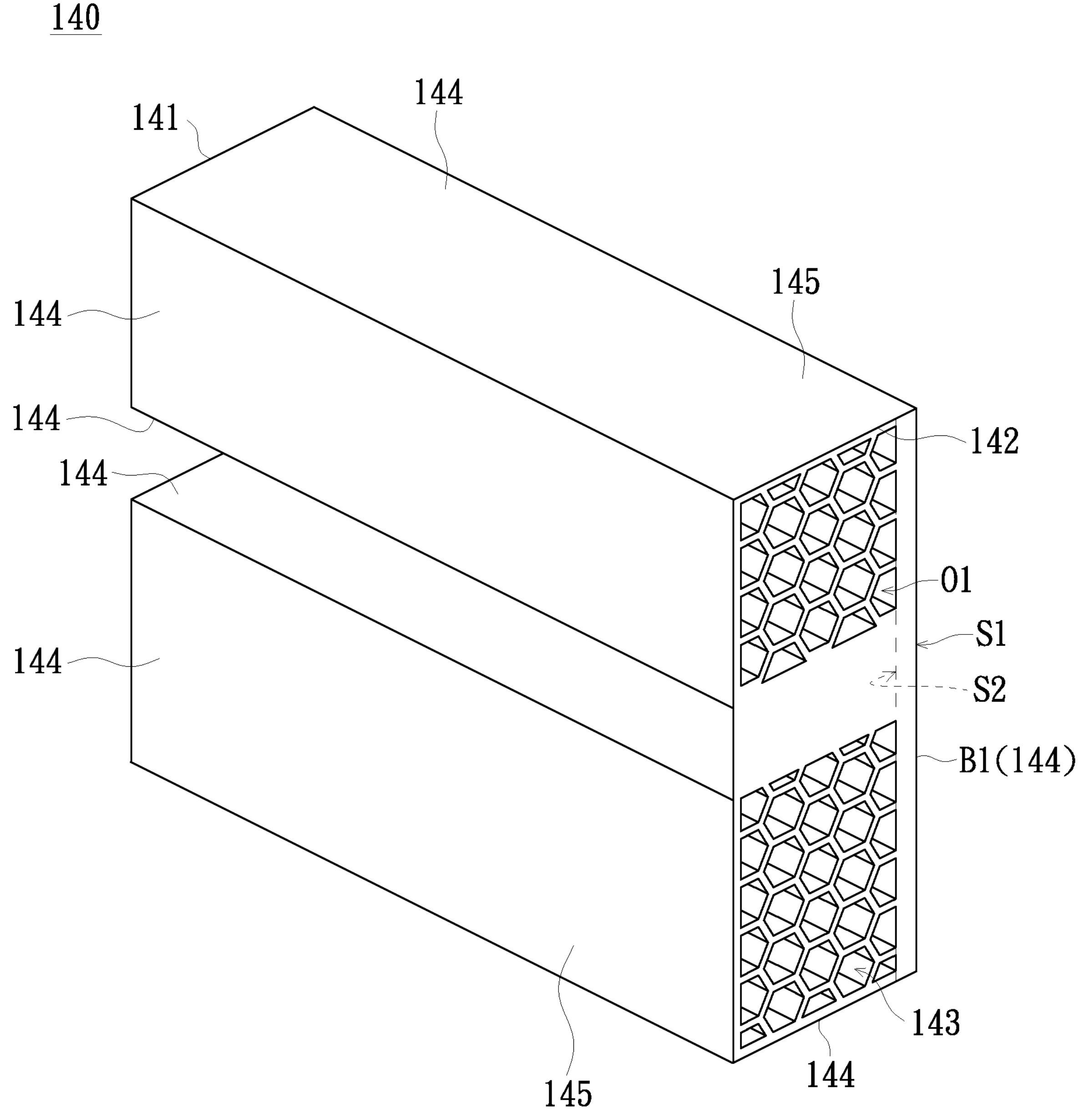
FIG. 2 is a three-dimensional schematic diagram of the first porous heat dissipation element in FIG. 1.
Figure 3:
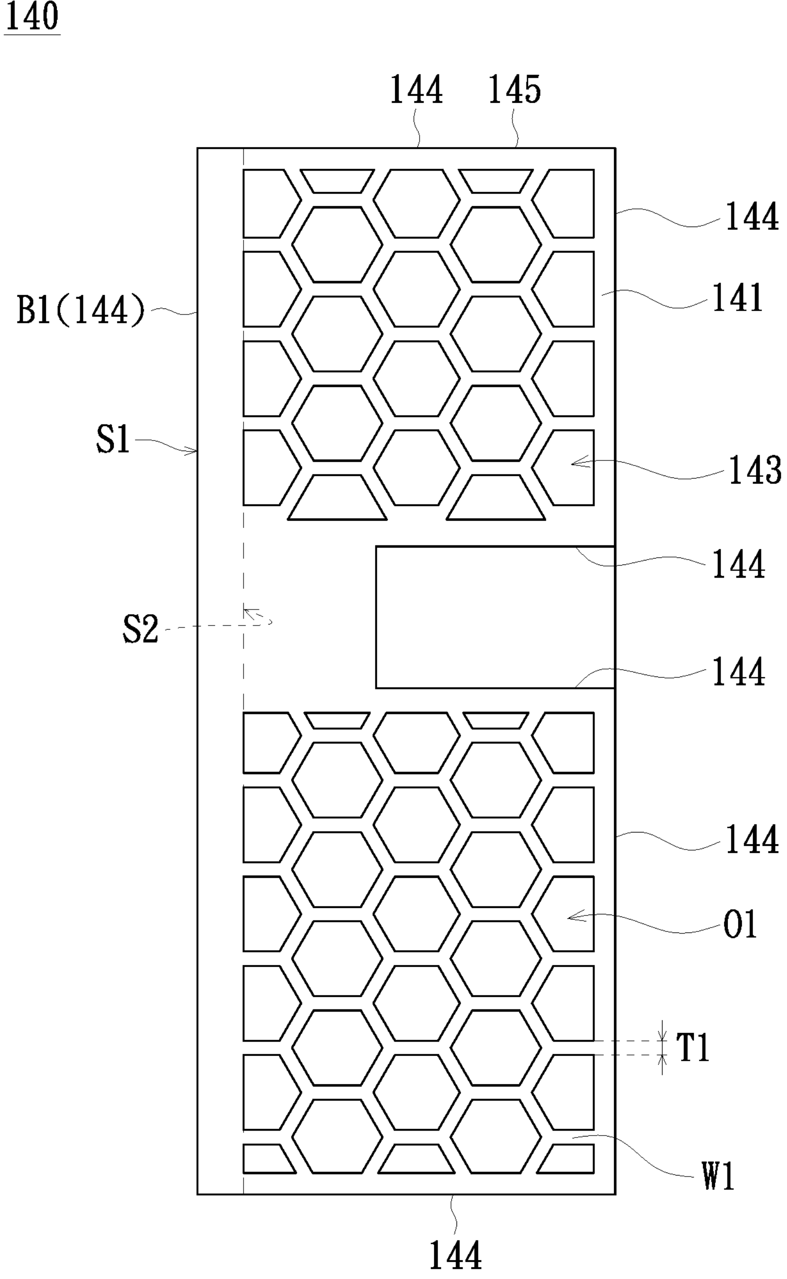
FIG. 3 is a schematic diagram of the first ventilation side of the first porous heat dissipation element of FIG. 2.
Figure 4:
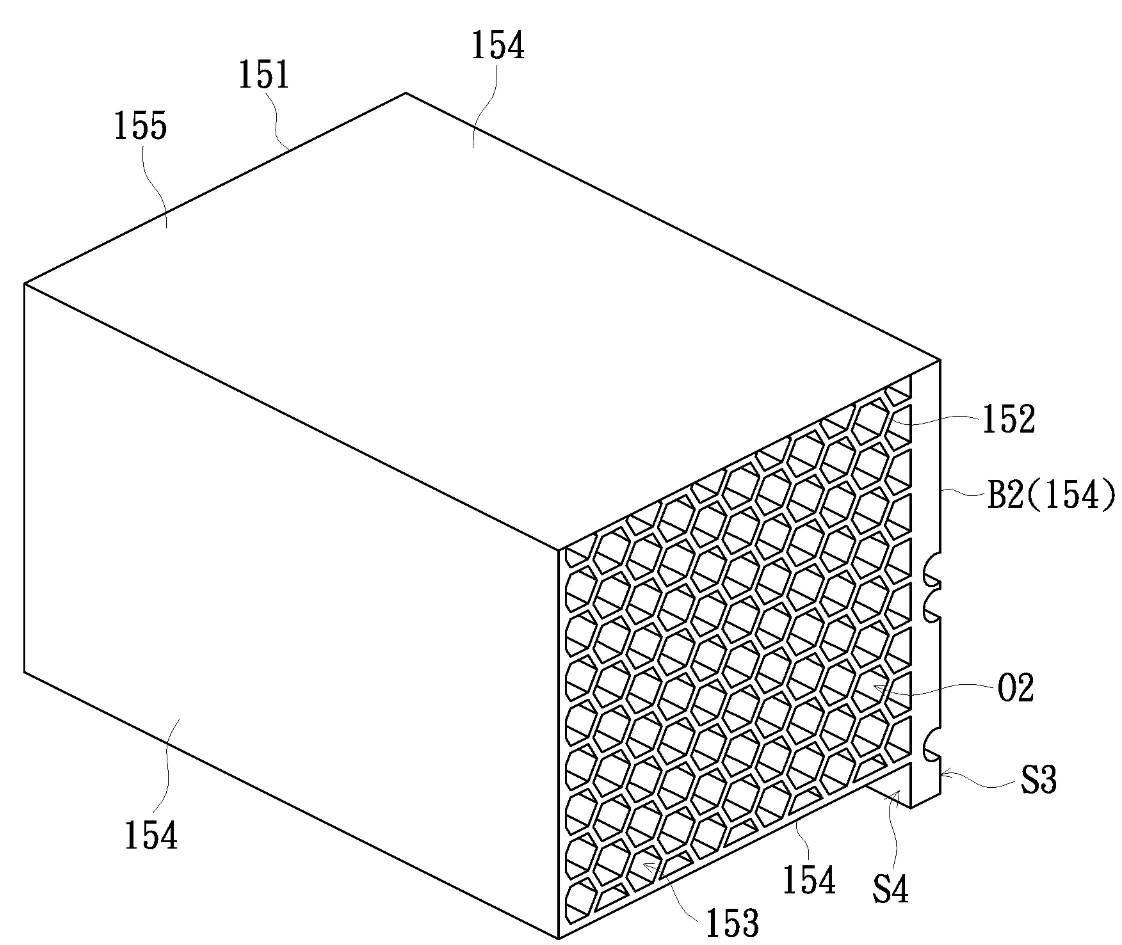
FIG. 4 is a three-dimensional schematic diagram of the second porous heat dissipation element in FIG. 1.
Figure 5:
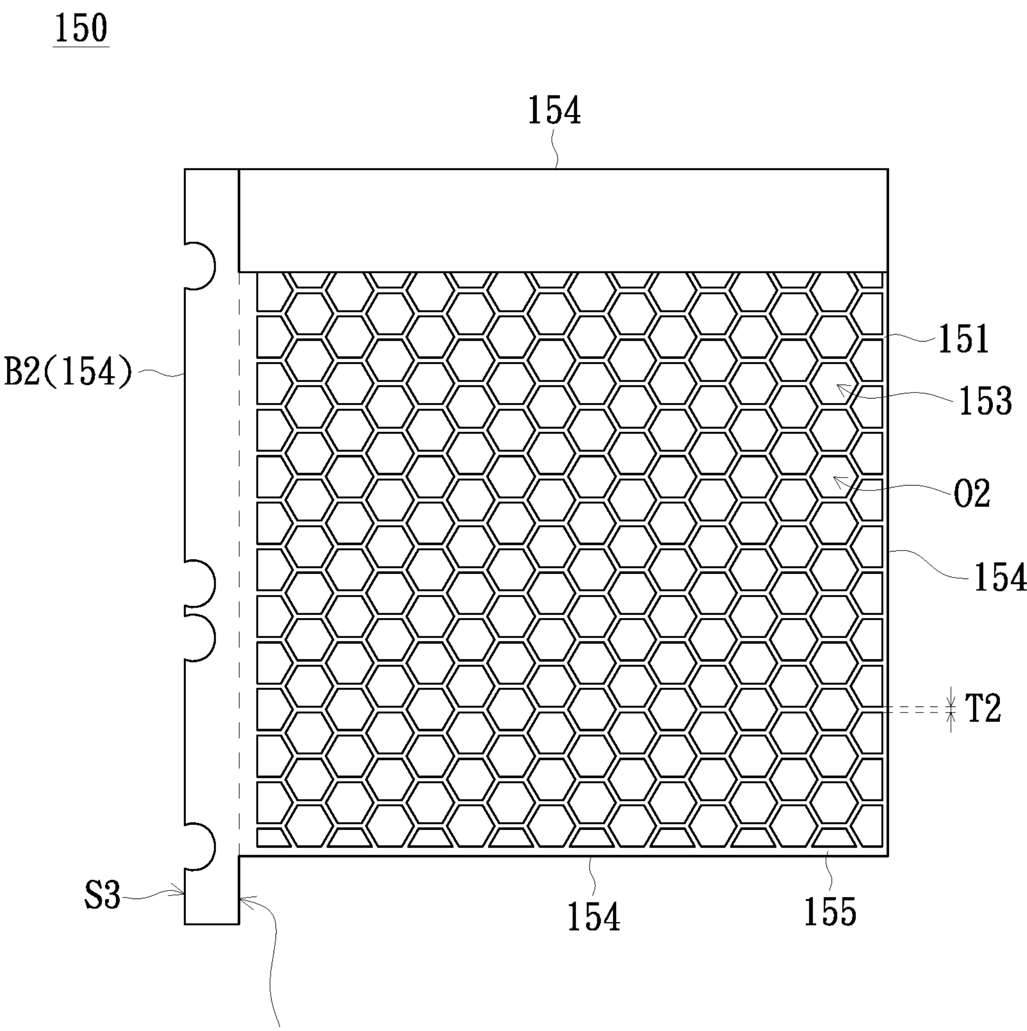
FIG. 5 is a schematic diagram of the third ventilation side of the second porous heat dissipation element of FIG. 4.

FIG. 1 is a schematic diagram of a projection device according to an embodiment of the disclosure. FIG. 2 is a three-dimensional schematic diagram of the first porous heat dissipation element in FIG. 1. FIG. 3 is a schematic diagram of the first ventilation side of the first porous heat dissipation element of FIG. 2. FIG. 4 is a three-dimensional schematic diagram of the second porous heat dissipation element in FIG. 1. FIG. 5 is a schematic diagram of the third ventilation side of the second porous heat dissipation element of FIG. 4. Please refer to FIG. 1 first. The projection device 100 includes a shell 110, a first heat source 120, a second heat source 130, a first porous heat dissipation element 140, a second porous heat dissipation element 150 and a guide pipe 160. The shell 110 has a first ventilation opening first ventilation opening V1 and a second ventilation opening V2. The first porous heat dissipation element 140 is connected to the first heat source 120. Please refer to FIGS. 1, 2 and 3 together. The first porous heat dissipation element 140 has a first ventilation side 141 (depicted in FIG. 3), a second ventilation side 142 and a plurality of first flow channels 143. The first ventilation side 141 and the second ventilation side 142 are opposite to each other. The first flow channels 143 extend from the first ventilation side 141 to the second ventilation side 142, and the first ventilation side 141 is located between the first ventilation opening V1 and the second ventilation side 142. Please refer to FIGS. 1, 4, and 5 together. The second porous heat dissipation element 150 is connected to the second heat source 130. The second porous heat dissipation element 150 has a third ventilation side 151 (depicted in FIG. 5), a fourth ventilation side 152 and a plurality of second flow channels 153. The third ventilation side 151 and the fourth ventilation side 152 are opposite to each other. The second flow channels 153 extend from the third ventilation side 151 to the fourth ventilation side 152, and the fourth ventilation side 152 is located between the third ventilation side 151 and the second ventilation opening V2. Continuing to refer to FIG. 1, the guide pipe 160 is connected between the second ventilation side 142 and the third ventilation side 151 and is communicated to the first flow channel 143 (depicted in FIG. 2) and the second flow channel 153 (depicted in FIG. 4).

It should be noted that the projection device 100 may further include a fan F. The fan F is located between the fourth ventilation side 152 and the second ventilation opening V2, and/or between the first ventilation opening V1 and the first ventilation side 141. In this embodiment, the fan F is exemplified by being located between the fourth ventilation opening 152 and the second ventilation opening V2. The fan F is configured to guide the airflow to flow through the first porous heat dissipation element 140, the guide pipe 160 and the second porous heat dissipation element 150 in sequence, and the airflow can flow out of the shell 110 from the first ventilation opening V1 or the second ventilation opening V2. The fan F of this embodiment guides the airflow A to flow out of the shell 110 from the second ventilation opening V2 as an example, but the disclosure does not impose any limitation on the flow direction of the airflow A. Specifically, the fan F of this embodiment can be located between the fourth ventilation side 152 and the second ventilation opening V2 to generate the airflow A that sequentially flows through the first porous heat dissipation element 140, the guide pipe 160 and the second porous heat dissipation element 150. Furthermore, a guide pipe T can be connected between the fan F and the fourth ventilation side 152 to increase the amount of the airflow A flowing through the first porous heat dissipation element 140, the guide pipe 160 and the second porous heat dissipation element 150. In addition, the fan F may be located at the first ventilation opening V1 or the first ventilation side 141 in one embodiment, and the disclosure does not impose any limitation on the position of the fan F. Similarly, the fan F may be located at the second ventilation opening V2 or the fourth ventilation side 152 in another embodiment. It is understood that the quantity of the fans F is not limited to that shown in FIG. 1. For example, the quantity of the fans F can be two in one embodiment, wherein one fan F is located between the first ventilation opening V1 and the first ventilation opening 141, and the other fan F is located between the fourth ventilation opening 152 and the second ventilation opening V2. The quantity of the fans F can be determined based on the factors such as heat dissipation demand and product cost, so the disclosure does not impose any limitation on quantity of the fans F. Incidentally, the fan F of this embodiment may include an axial flow fan, but the fan F may include a drum fan (blower) in other embodiments.

In this embodiment, the first flow channel 143 (depicted in FIG. 2) of the first porous heat dissipation element 140 can allow the airflow A generated by the fan F to flow therethrough to dissipate heat from the first heat source 120. Similarly, the second flow channel 153 (depicted in FIG. 4) of the second porous heat dissipation element 150 can allow the airflow A generated by the fan F to flow therethrough to dissipate heat from the second heat source 130. Please refer to FIGS. 2 and 3 again. The first porous heat dissipation element 140 may further have a plurality of first sidewalls 144 connected between the first ventilation side 141 and the second ventilation side 142. In detail, the first flow channels 143 can form a plurality of openings O1 on the first ventilation side 141 and the second ventilation side 142 to allow the airflow A (depicted in FIG. 1) to flow therethrough. On the other hand, the first sidewalls 144 can block the airflow A from flowing out of the part other than the first ventilation side 141 and the second ventilation side 142, so as to increase the amount of the airflow A flowing through the first flow channels 143, thereby improving the heat dissipation efficiency. For example, the shape of the first flow channel 143 can be cylindrical, and the airflow A generated by the fan F can pass along the axial direction of the first flow channel 143, while the first sidewall 144 can be arranged around the axial direction of the first flow channel 143 to prevent the airflow A from flowing out radially along the first flow channel 143.

Furthermore, one of the first sidewalls 144 can function as the base B1 of the first porous heat dissipation element 140 and can have a first surface S1 and a second surface S2 opposite to each other. The first heat source 120 (depicted in FIG. 1) is arranged on the first surface S1, while the first ventilation side 141, the second ventilation side 142 and the first flow channels 143 are located on a part or all the second surface S2. Specifically, the first porous heat dissipation element 140 may further have a first heat dissipation block 145 located on the second surface S2 of the first sidewall 144. The first ventilation side 141 and the second ventilation side 142 are located on the opposite sides of the first heat dissipation block 145, respectively. The first flow channels 143 can extend from the first ventilation side 141 to the second ventilation side 142 to penetrate the first heat dissipation block 145. In short, the first heat dissipation block 145 can allow the airflow A generated by the fan F (depicted in FIG. 1) to flow therethrough to provide the heat dissipation function. In this embodiment, the first flow channels 143 may be located on a part of the second surface S2. In other words, the first heat dissipation block 145 can cover a part of the second surface S2, so that the part of the second surface S2 exposed by the first heat dissipation block 145 can be used for the screw lock attachment. It can be understood that the disclosure does not impose any restriction on the position of the screw lock attachment. In one embodiment, the first flow channels 143 may be located on all the second surface S2. In other words, the first heat dissipation block 145 can cover all the second surface S2, which can increase the volume of the first heat dissipation block 145 and thus improve the heat dissipation efficiency.

Please refer to FIGS. 4 and 5. Similarly, the second porous heat dissipation element 150 may further have a plurality of second sidewalls 154 connected between the third ventilation side 151 and the fourth ventilation side 152. In detail, the second flow channels 153 can form a plurality of openings O2 on the third ventilation side 151 and the fourth ventilation side 152 to allow the airflow A (depicted in FIG. 1) to flow therethrough. In addition, the second sidewalls 154 can block the airflow A from flowing out of the part other than the third ventilation side 151 and the fourth ventilation side 152, so as to increase the amount of the airflow A flowing through the second flow channels 153, thereby improving the heat dissipation efficiency. For example, the shape of the second flow channel 153 can be cylindrical, and the airflow A generated by the fan F can flow along the axial direction of the second flow channel 153, while the second sidewall 154 can be arranged around the axial direction of the second flow channel 153 to prevent the airflow A from flowing out radially along the second flow channel 153.

In this embodiment, one of the second sidewalls 154 can function as the base B2 of the second porous heat dissipation element 150 and can have a third surface S3 and a fourth surface S4 opposite to each other. The second heat source 130 (depicted in FIG. 1) is arranged on the third surface S3, while the third ventilation side 151, the fourth ventilation side 152 and the second flow channels 153 are located on a part or all the second surface S2. Specifically, the second porous heat dissipation element 150 may further have a second heat dissipation block 155 located on the fourth surface S4 of the second sidewall 154. The third ventilation side 151 and the fourth ventilation side 152 are located on the opposite sides of the second heat dissipation block 155, respectively. The second flow channels 153 can extend from the third ventilation side 151 to the fourth ventilation side 152 to penetrate the second heat dissipation block 155. In short, the second heat dissipation block 155 can allow the airflow A (depicted in FIG. 1) to flow therethrough to provide the heat dissipation function. In this embodiment, the second flow channels 153 may be located on a part of the fourth surface S4. In other words, the second heat dissipation block 155 can cover a part of the fourth surface S4, so that the part of the fourth surface S4 exposed by the second heat dissipation block 155 can be used for the screw lock attachment. It can be understood that the disclosure does not impose any restriction on the position of the screw lock attachment. In one embodiment, the second flow channels 153 may be located on all the fourth surface S4. In other words, the second heat dissipation block 155 can cover all the fourth surface S4, which can increase the volume of the second heat dissipation block 155 and thus improve the heat dissipation efficiency.

Figure 6:
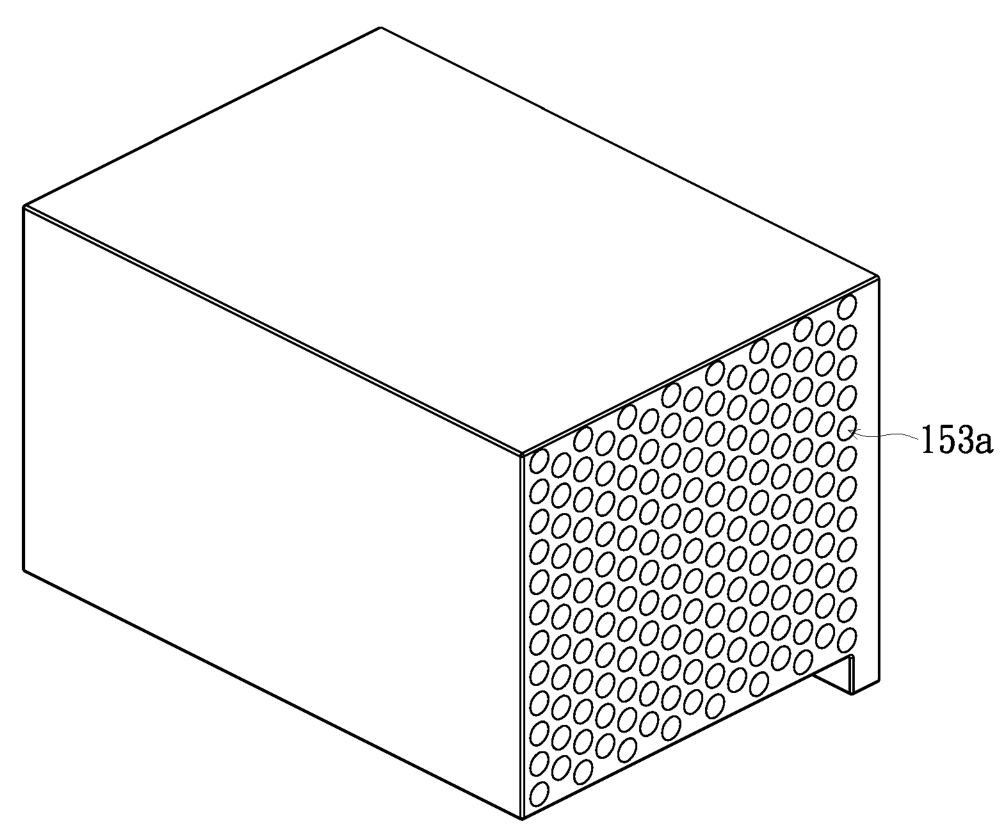
FIG. 6 is a three-dimensional schematic diagram of a second porous heat dissipation element in another embodiment of the disclosure.

As shown in FIGS. 2 and 4, the shape of the first flow channel 143 and the shape of the second flow channel 153 include, for example, cylindrical or hexagonal columns, wherein FIGS. 2 and 4 are examples of hexagonal columns. Furthermore, the first flow channel 143 and the second flow channel 153 may have hexagonal cross-sectional shapes parallel to the radial and circumferential directions. In addition, in the second porous heat dissipation element 150*a* of FIG. 6, the second flow channel 153*a* is cylindrical as an example, while the first flow channel 153*a* is cylindrical and roughly similar to the second flow channel 153*a* in FIG. 6. Similarly, the second flow channel 153*a* and the first flow channel may have a circular cross-section shape parallel to the radial and circumferential directions. Please refer to FIGS. 2 and 4 again. Because the shape of the first flow channel 143 and the shape of the second flow channel 153 can include hexagonal columns (or cylinders), the volume proportion of the first flow channels 143 in the first porous heat dissipation element 140 can be maximized, and the volume proportion of the second flow channels 153 in the second porous heat dissipation element 150 can also be maximized, thus further improving the heat dissipation efficiency. Specifically, compared to the conventional heat dissipation element using fins, the heat dissipation area formed by the first flow channels 143 in the first porous heat dissipation element 140 can increase by about 20% or more. Similarly, the heat dissipation area formed by the second porous heat dissipation elements 150 in the second flow channel 153 can increase by about 20% or more, compared to the conventional fins. For example, in one embodiment, the heat dissipation area formed by the first flow channels 143 in the first porous heat dissipation element 140 can be approximately 200,000 to 220,000 $mm^2$, while the heat dissipation area formed by the second flow channels 153 in the second porous heat dissipation element 150 is roughly the same. However, the aforementioned conventional heat dissipation elements of the same volume can only provide a heat dissipation area of approximately 160,000 $mm^2$ at most. Therefore, it can be seen that under the same volume, the heat dissipation area formed by the porous heat dissipation element of the disclosure can increase {((200,000 to 220,000)−160,000)/(200,000 to 220,000)} *100%=20% to 27%, compared to the conventional fin heat dissipation area.

Please refer to FIGS. 2 and 3 again. In this embodiment, the first flow channels 143 can be distributed in all the first heat dissipation element 140, so that the volume proportion of the first flow channels 143 in the first heat dissipation element 140 can be maximized, thus further improving the heat dissipation efficiency. Similarly, please refer to FIGS. 4 and 5 again. The second flow channels 153 of this embodiment can be distributed in all the second porous heat dissipation element 150. In this way, the volume proportion of the second flow channels 153 in the second porous radiating element 150 can be maximized, thereby further improving the heat dissipation efficiency.

Please refer to FIGS. 3 and 5 together. In one embodiment, the wall thickness T1 of the first flow channel 143 and the wall thickness T2 of the second flow channel 153 are both, for example, less than or equal to 1.2 mm. In this way, the volume proportion of the first flow channels 143 in the first porous heat dissipation element 140 and the volume proportion of the second flow channels 153 in the second porous heat dissipation element 150 can be further increased, so that the first porous heat dissipation element 140 and the second porous heat dissipation element 150 have a larger heat dissipation area, thereby further improving the heat dissipation efficiency. For example, in one embodiment, the wall thickness T1 of the first flow channel 143 and the wall thickness T2 of the second flow channel 153 can be approximately 1 to 1.2 mm. However, for the conventional heat dissipation elements of the same volume, the thickness of the fins is at least 1.45 mm. It should be noted that as shown in FIG. 3, the first flow channel 143 can penetrate the first heat dissipation block 145 to form a plurality of sidewalls W1, and the wall thickness T1 is, for example, the thickness of the sidewall W1 between any two adjacent first flow channels 143. The definition of the wall thickness T2 of the second flow channel 153 in FIG. 5 is roughly the same as that of the first flow channel 143, and no redundant detail is to be given herein.

Please refer to FIGS. 3 and 5 again. In this embodiment, it is to be noted that because the shape of the first flow channel 143 and the shape of the second flow channel 153 can include cylindrical or hexagonal columns, not only can the volume proportion of the first flow channels 143 in the first porous heat dissipation element 140 and the volume proportion of the second flow channels 153 in the second porous heat dissipation element 150 be maximized, it can also enhance the structural strength of the first porous heat dissipation element 140 and the second porous heat dissipation element 150. In detail, compared to the conventional heat dissipation element using fins, although the wall thickness T1 of the first flow channel 143 and the wall thickness T2 of the second flow channel 153 are smaller, the first porous heat dissipation element 140 and the second porous heat dissipation element 150 can still have improved structural strength due to that the shape of the first flow channel 143 and the shape of the second flow channel 153 can include cylindrical or hexagonal columns. For example, in one embodiment, the shape of the first flow channel 143 and the shape of the second flow channel 153 may include hexagonal columns, and the wall thickness T1 of the first flow channel 143 and the wall thickness T2 of the second flow channel 153 are, for example, about 1 mm. In another embodiment, the shape of the first flow channel 143 and the shape of the second flow channel 153 may include cylindrical columns, and the wall thickness T1 of the first flow channel 143 and the wall thickness T2 of the second flow channel 153 are, for example, about 1.2 mm. It can be understood that the above values are only examples, and the disclosure is not limited thereto.

Figure 7:
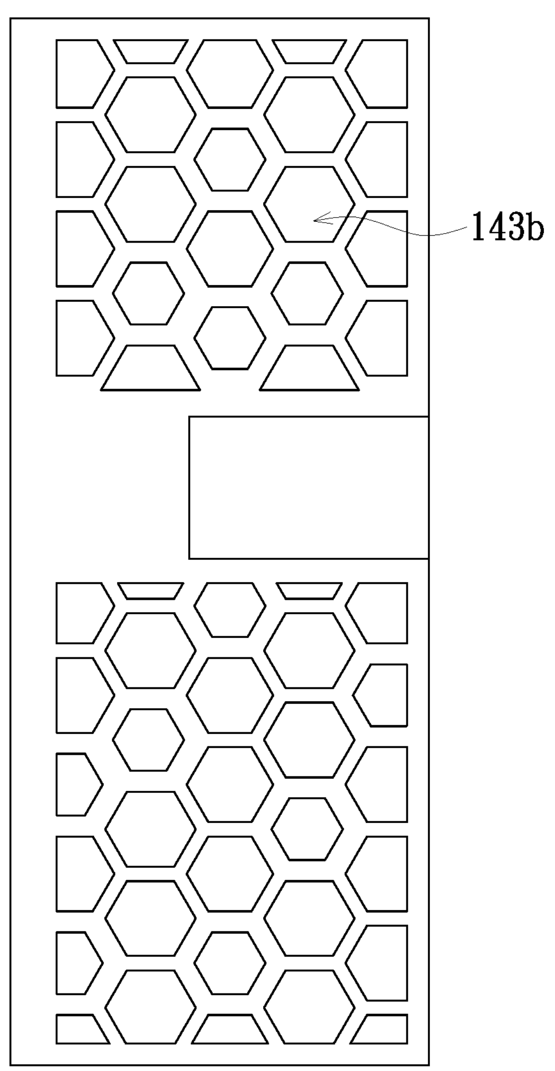
FIG. 7 is a schematic diagram of a first porous heat dissipation element in another embodiment of the disclosure.
Figure 8:
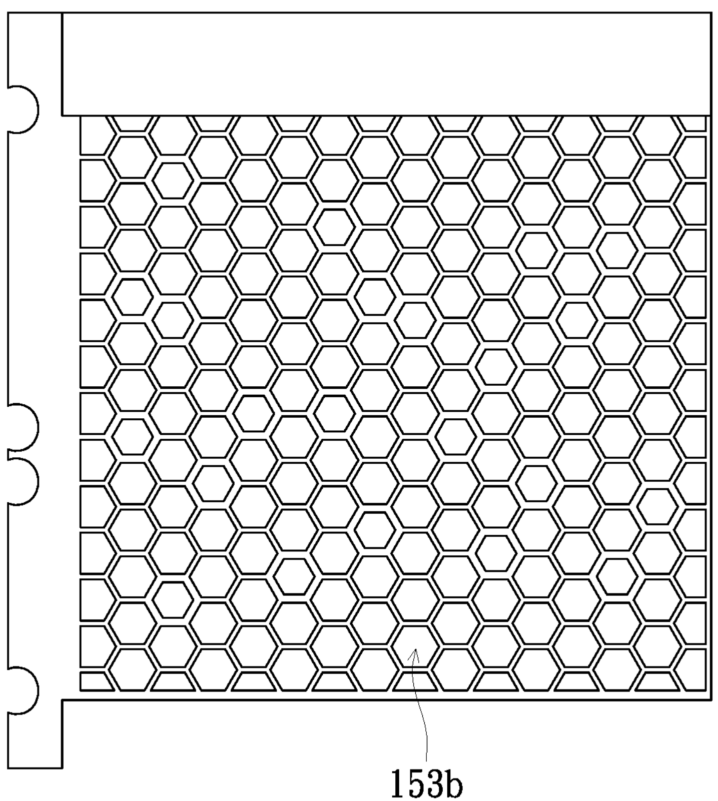
FIG. 8 is a schematic diagram of a second porous heat dissipation element in another embodiment of the disclosure.

Incidentally, please refer to FIG. 7. In the first porous heat dissipation element 140*b* of this embodiment, the volumes of the first flow channels 143*b* may differ from each other. For example, in one embodiment, the cross-sectional areas of the first flow channels 143*b* parallel to the radial and circumferential directions may differ from each other. Similarly, in the second porous heat dissipation element 150*b* of this embodiment as shown in FIG. 8, the volumes of the second flow channels 153*b* may differ from each other. For example, the cross-sectional areas of the second flow channels 153*b* parallel to the radial and circumferential directions may differ from each other in another embodiment. Please refer to FIGS. 7 and 8 together. The volume of the first flow channel 143*b* and the volume of the second flow channel 153*b* can vary depending on different flow fields or actual needs, and the disclosure does not impose any limitations on these details.

Please refer to FIG. 1 again. The guide pipe 160 of this embodiment can form a guide space to guide the airflow A generated by the fan F to flow more concentrated through the first porous heat dissipation element 140 and the second porous heat dissipation element 150, thereby increasing the amount the airflow A flow rate through the first porous heat dissipation element 140 and the second porous heat dissipation element 150. In this embodiment, the material of the guide pipe 160 includes, for example, plastic, which can reduce costs and slightly reduce the overall weight of the projection device 100. Moreover, because of the non thermal conductivity of the plastic material, the low thermal conductivity characteristic can block the heat generated by other external parts. In an embodiment, the aforementioned plastic may include mylar. Specifically, the shape of the aforementioned mylar can be in the form of sheets and formed into pipes by adhesive or other means. In addition, the aforementioned plastic can form a pipe structure in an integrated manner, and the disclosure does not impose any limitations on these details. In another embodiment, the material of the guide pipe 160 may include metal to improve the heat dissipation efficiency. The aforementioned metal may include aluminum or copper, but other embodiments are not limited thereto. Incidentally, in this embodiment, the guide pipe 160 can be fixed to the first porous heat dissipation element 140 and the second porous heat dissipation element 150 by adhesive bonding, but the disclosure is not limited thereto.

The first heat source 120 of this embodiment may include a light valve, and the second heat source 130 may include a light source. In detail, the light source can be configured to provide an illumination beam, and the light valve can be arranged on the transmission path of the illumination beam to convert the illumination beam into an image beam. Furthermore, the projection device 100 may further include a projection lens L arranged on the transmission path of the image beam to project the image beam.

The aforementioned light source includes, for example, a laser diode (LD). The quantity of the laser diodes can be one or more. For example, in one embodiment, the quantity of the laser diodes is plural, and the laser diodes can be arranged into a matrix. In another embodiment, the aforementioned light source may include a light emitting diode (LED). Similarly, the quantity of the light emitting diodes can be plural and arranged in a matrix. Incidentally, the light source of this embodiment can generate an illumination beam with a single wavelength. A wavelength conversion element can be arranged on the transmission path of the illumination beam to convert the illumination beam into a plurality of beams with different wavelengths. However, the disclosure does not impose any further limitations on these details.

In this embodiment, the aforementioned light valve includes, for example, a digital micromirror device (DMD). However, the light valve may include liquid crystal on silicon (LCoS) or liquid crystal display (LCD) in another embodiment. Furthermore, in the embodiment where the light valve adopts a liquid crystal display panel, the light valve may adopt a single chip liquid crystal display panel or a three chip liquid crystal display panel architecture, for example, and the disclosure is not limited thereto.

In this embodiment, the shell 110 can be used to accommodate the first heat source 120, the second heat source 130, the first porous heat dissipation element 140, the second porous heat dissipation element 150 and the guide pipe 160. In addition, the first ventilation opening V1 and second ventilation opening V2 of the shell 110 can allow the external cooling airflow A to flow therethrough to dissipate the heat from the first porous heat dissipation element 140 and the second porous heat dissipation element 150. The material of the shell 110 includes, for example, metal or plastic, but the disclosure is not limited thereto.

Compared to the prior art, the projection device 100 of this embodiment adopts a first porous heat dissipation element 140 and a second porous heat dissipation element 150 to dissipate heat from the first heat source 120 and the second heat source 130. Specifically, because the first porous heat dissipation element 140 and the second porous heat dissipation element 150 can provide sufficient heat dissipation area within a limited space, the first porous heat dissipation element 140 and the second porous heat dissipation element 150 can be more flexibly arranged according to the heat dissipation needs of different heat sources. In addition, the first porous heat dissipation element 140 and the second porous heat dissipation element 150 are connected by a guide pipe 160 to avoid significant air loss between the first porous heat dissipation element 140 and the second porous heat dissipation element 150, thereby increasing the amount of the airflow A flowing through the first porous heat dissipation element 140 and the second porous heat dissipation element 150. Therefore, the projection device 100 of this embodiment can improve the heat dissipation efficiency of different heat sources in a limited space.

Figure 9:
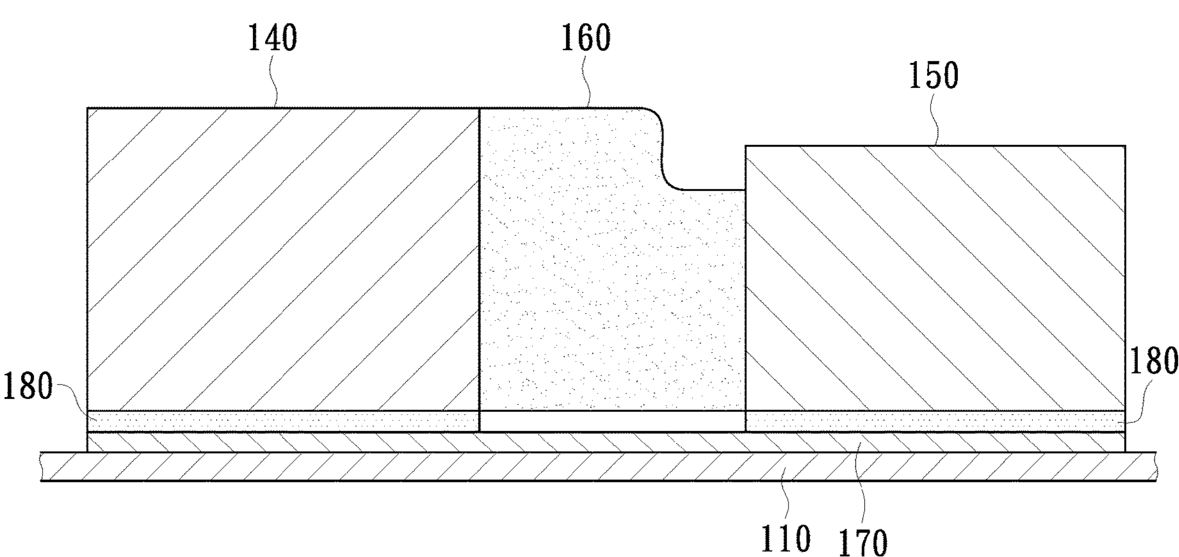
FIG. 9 is a schematic diagram of a projection device according to another embodiment of the disclosure.

FIG. 9 is a schematic diagram of a projection device according to another embodiment of the disclosure. The structure and advantages of the projection device 100*c* in this embodiment are similar to those in the embodiment of FIG. 1, and only the differences will be explained below. Please refer to FIG. 9. The projection device 100*c* may further include a heat conductive element 170 and a heat conductive layer 180. The heat conductive element 170 is fixed to the first porous heat dissipation element 140 and the second porous heat dissipation element 150. The heat conductive layer 180 is arranged between the heat conductive element 170 and the first porous heat dissipation element 140 and is also arranged between the heat conductive element 170 and the second porous heat dissipation element 150. In this way, the heat energy accumulated in the first porous heat dissipation element 140 and the second porous heat dissipation element 150 can be more quickly transferred to the heat conductive element 170 through the heat conductive layer 180, and the heat conductive element 170 can quickly transfer the heat energy, thus further improving the heat dissipation efficiency. Specifically, the material of the heat conductive element 170 may include metal. Furthermore, the heat conductive element 170 is, for example, a stamping part. In addition, the first porous heat dissipation element 140 and the second porous heat dissipation element 150 can be fixed to the same heat conductive element 170 in this embodiment. However, the first porous heat dissipation element 140 and the second porous heat dissipation element 150 can be fixed to different heat conductive elements 170 in one embodiment. In another embodiment, the material of the shell 110 can be metal and the shell 110 can serve as a heat conductive element 170. In this embodiment, the heat conductive layer 180 may include a thermal pad or a thermal paste. Furthermore, the material of the heat conductive layer 180 may include silicone adhesive in one embodiment, but the disclosure does not impose any specific limitations on the specific material of the heat conductive layer 180. Incidentally, the material of the guide pipe 160 can be metal in another embodiment, and the guide pipe 160 can be fixed to the heat conductive element 170 through the heat conductive layer 180, thereby further improving the heat dissipation efficiency.

Figure 10:
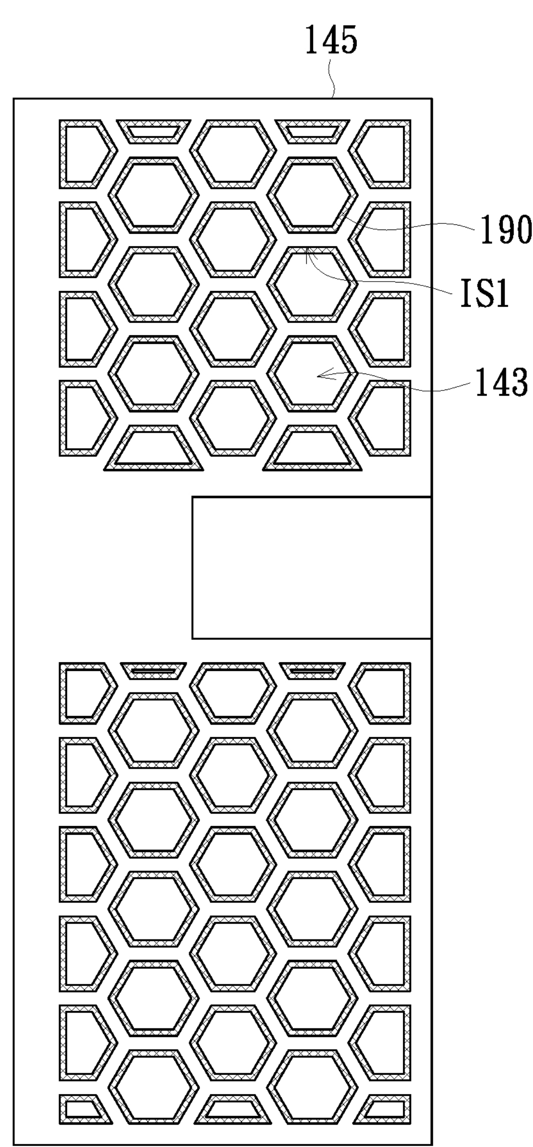
FIG. 10 is a schematic diagram of a part of a projection device in another embodiment of the disclosure.
Figure 11:
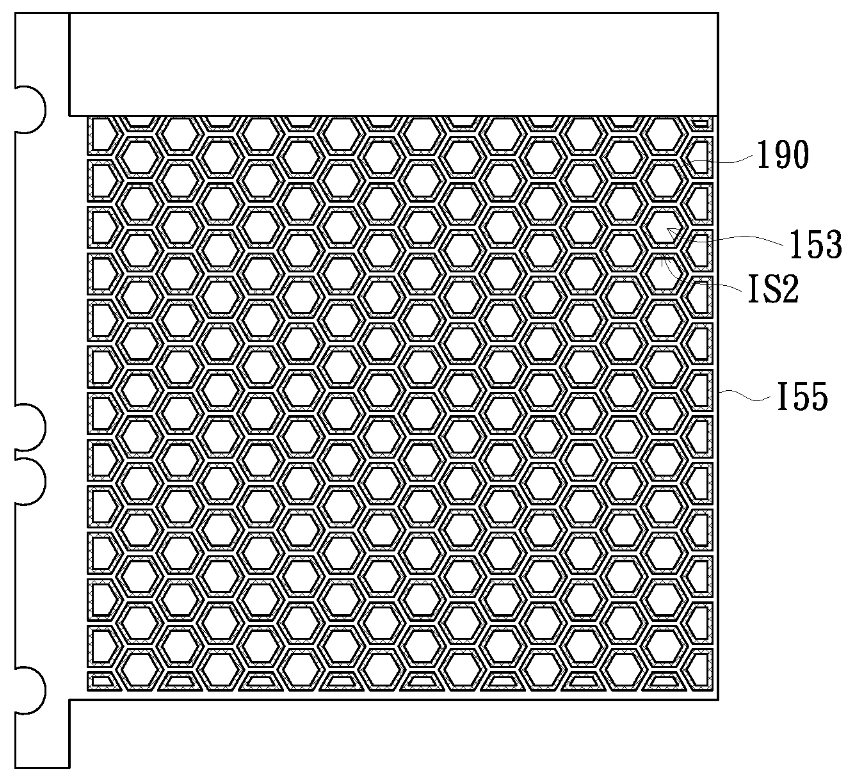
FIG. 11 is a schematic diagram of another part of the projection device shown in FIG. 10 in another embodiment of the disclosure.
Figure 12:
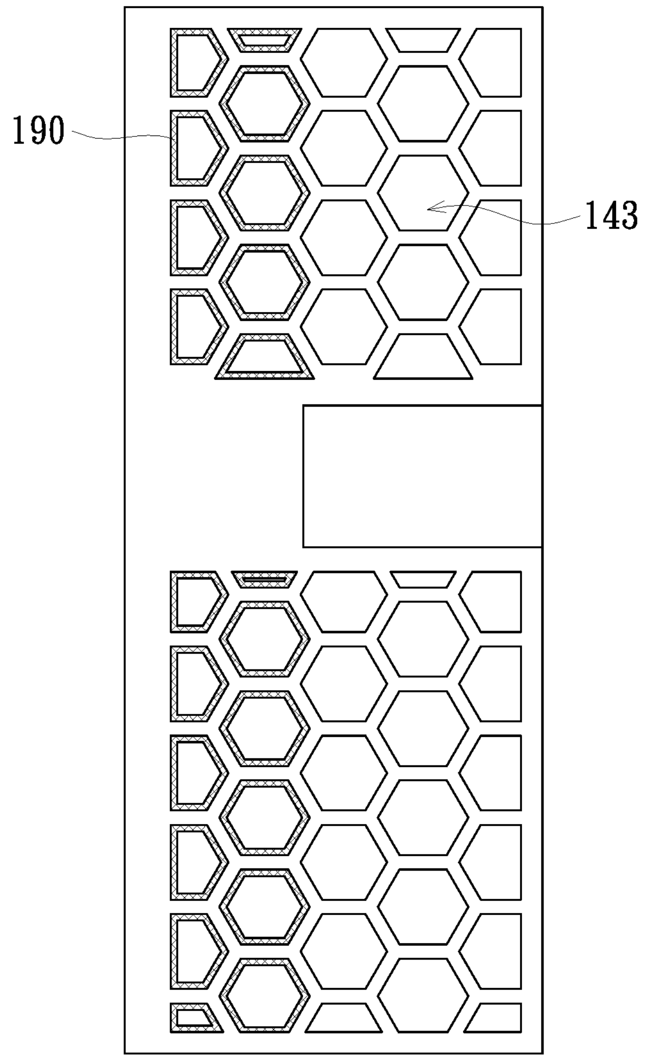
FIG. 12 is a schematic diagram of a first porous heat dissipation element in another embodiment of the disclosure.
Figure 13:
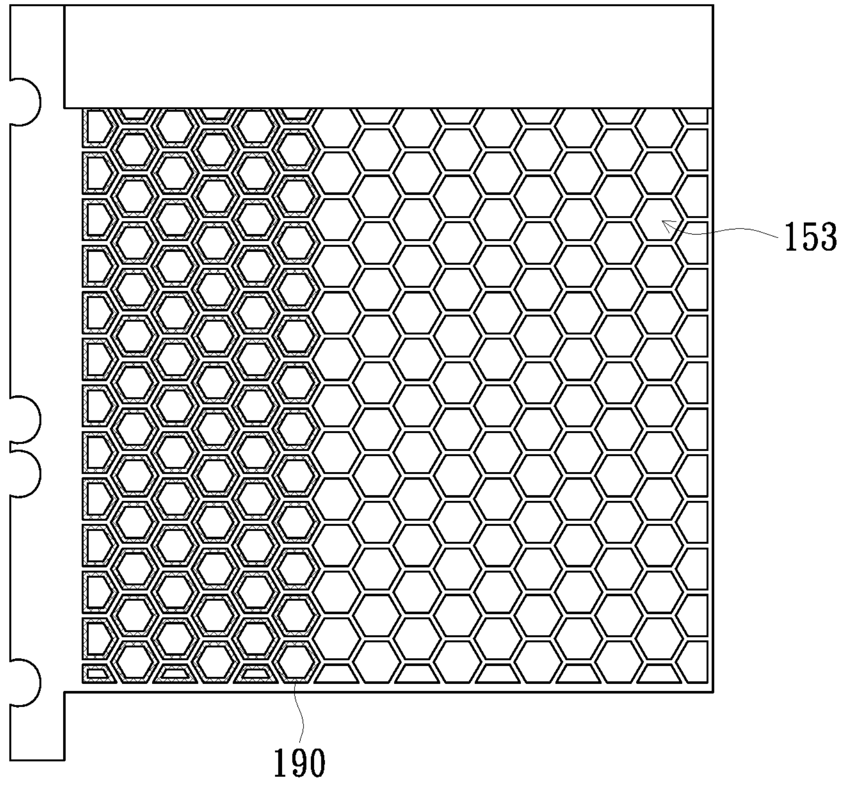
FIG. 13 is a schematic diagram of a second porous heat dissipation element in another embodiment of the disclosure.

FIG. 10 is a schematic diagram of a part of a projection device in another embodiment of the disclosure. FIG. 11 is a schematic diagram of another part of the projection device shown in FIG. 10 in another embodiment of the disclosure. FIG. 12 is a schematic diagram of a first porous heat dissipation element in another embodiment of the disclosure. FIG. 13 is a schematic diagram of a second porous heat dissipation element in another embodiment of the disclosure. The structure and advantages of the projection device 100*d* in this embodiment are similar to those of the embodiment of FIG. 1, and only the differences will be explained below. Please refer to FIGS. 10 and 11 first. For example, the projection device 100*d* includes a heat dissipation layer 190. The heat dissipation layer 190 can be arranged in all the first flow channels 143 and all the second flow channels 153 to further improve the heat dissipation efficiency. Specifically, the first flow channels 143 penetrate the first heat dissipation block 145 and form a plurality of first inner side surfaces IS1 within the first heat dissipation block 145. Similarly, the second flow channels 153 penetrate the second heat dissipation block 155 and form a plurality of second inner side surfaces IS2 within the second heat dissipation block 155. The heat dissipation layer 190 can be arranged on the first inner side surfaces IS1 and the second inner side surfaces IS2. Furthermore, the heat dissipation layer 190 can adhere to the first inner side surfaces IS1 and the second inner side surfaces IS2 when passing through the first flow channels 143 and the second flow channels 153 through the siphon principle. In one embodiment, the material of the heat dissipation layer 190 may include graphene, but the disclosure is not limited thereto. In another embodiment as shown in FIGS. 12 and 13, the heat dissipation layer 190 can be arranged in part of the first flow channels 143 and part of the second flow channels 153, thereby shortening the time required for arranging the heat dissipation layer 190. Furthermore, the heat dissipation layer 190 can be arranged in part of the first flow channels 143 near the first heat source 120 (depicted in FIG. 1) and part of the second flow channels 153 near the second heat source 130 (depicted in FIG. 1). Incidentally, parts the first flow channels 143 and the second flow channels 153 can be covered by the mold first, and then the process of setting the heat dissipation layer 190 can be performed out in this embodiment.

In summary, the projection device of the disclosure adopts a first porous heat dissipation element and a second porous heat dissipation element to dissipate heat from the first heat source and the second heat source. Specifically, because the first porous heat dissipation element and the second porous heat dissipation element can provide sufficient heat dissipation area within a limited space, the first porous heat dissipation element and the second porous heat dissipation element can be more flexibly arranged according to the heat dissipation needs of different heat sources. In addition, the first porous heat dissipation element and the second porous heat dissipation element are connected by a guide pipe to avoid significant air loss between the first porous heat dissipation element and the second porous heat dissipation element, thereby increasing the amount of the airflow flowing through the first porous heat dissipation element and the second porous heat dissipation element. Therefore, the projection device of the disclosure can improve the heat dissipation efficiency of different heat sources in a limited space.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "The disclosure" or the like is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device, comprising:

a shell, having a first ventilation opening and a second ventilation opening;

a first heat source;

a first porous heat dissipation element, connected to the first heat source, wherein the first porous heat dissipation element has a first ventilation side, a second ventilation side and a plurality of first flow channels, the first ventilation side is opposite to the second ventilation side, the plurality of first flow channels extend from the first ventilation side to the second ventilation side, and the first ventilation side is located between the first ventilation opening and the second ventilation side;

a second heat source;

a second porous heat dissipation element, connected to the second heat source, wherein the second porous heat dissipation element has a third ventilation side, a fourth ventilation side and a plurality of second flow channels, the third ventilation side is opposite to the fourth ventilation side, the plurality of second flow channels extend from the third ventilation side to the fourth ventilation side, and the fourth ventilation side is located between the third ventilation side and the second ventilation opening; and a guide pipe, connected between the second ventilation side and the third ventilation side and communicated with the plurality of first flow channels and the plurality of second flow channels.

2. The projection device according to claim 1, further comprising a fan, wherein the fan is located between the first ventilation opening and the first ventilation side and/or the fan is located between the fourth ventilation side and the second ventilation opening, the fan is configured to guide an airflow to flow through the first porous heat dissipation element, the guide pipe and the second porous heat dissipation element in sequence, and the airflow flows out of the shell from the second ventilation opening.

3. The projection device according to claim 1, wherein the first porous heat dissipation element further has a plurality of first sidewalls, the plurality of first sidewalls are connected between the first ventilation side and the second ventilation side, the second porous heat dissipation element further has a plurality of second sidewalls, and the plurality of second sidewalls are connected between the third ventilation side and the fourth ventilation side.

4. The projection device according to claim 1, wherein shapes of the plurality of first flow channels and the plurality of second flow channels comprise cylindrical or hexagonal columns.

5. The projection device according to claim 1, wherein the plurality of first flow channels are distributed in all the first porous heat dissipation element, and the plurality of second flow channels are distributed in all the second porous heat dissipation element.

6. The projection device according to claim 1, wherein:

the first porous heat dissipation element further has a first sidewall, the first sidewall has a first surface and a second surface opposite to each other, the first heat source is arranged on the first surface, and the first ventilation side, the second ventilation side and the plurality of first flow channels are located on a part or all the second surface; and the second porous heat dissipation element further has a second sidewall, the second sidewall has a third surface and a fourth surface opposite to each other, the second heat source is arranged on the third surface, and the third ventilation side, the fourth ventilation side and the plurality of second flow channels are located on a part or all the fourth surface.

7. The projection device according to claim 1, further comprising a heat dissipation layer, wherein the heat dissipation layer is arranged in all the plurality of first flow channels and all the plurality of second flow channels, or in part of the plurality of first flow channels and part of the plurality of second flow channels.

8. The projection device according to claim 1, wherein a material of the guide pipe comprises metal or plastic.

9. The projection device according to claim 1, further comprising a heat conductive element and a heat conductive layer, wherein the heat conductive element is fixed to the first porous heat dissipation element and the second porous heat dissipation element, the heat conductive layer is arranged between the heat conductive element and the first porous heat dissipation element, and the heat conductive layer is arranged between the heat conductive element and the second porous heat dissipation element.

10. The projection device according to claim 1, wherein the first heat source comprises a light valve, and the second heat source comprises a light source.

11. The projection device according to claim 1, wherein volumes of the plurality of first flow channels are different from each other, and volumes of the plurality of second flow channels are different from each other.

* * * * *